United States Patent [19]
Oetiker

[11] 3,891,250
[45] June 24, 1975

[54] HOSE CONNECTION

[76] Inventor: Hans Oetiker, 21 Oberdorfstrasse, Horgen, Switzerland

[22] Filed: Jan. 2, 1973

[21] Appl. No.: 320,625

[30] Foreign Application Priority Data
Dec. 30, 1971 Switzerland .................... 19166/71

[52] U.S. Cl. ............................................. 285/242
[51] Int. Cl. ............................................. F16l 33/00
[58] Field of Search .......... 285/242, 238, 239, 252, 285/250, 253, 255

[56] References Cited
UNITED STATES PATENTS

| | | | |
|---|---|---|---|
| 1,303,098 | 5/1919 | Merz | 285/252 |
| 1,785,638 | 12/1930 | Ludwig | 285/242 X |
| 3,142,502 | 7/1964 | Luther | 285/242 |
| 3,165,338 | 1/1965 | Moss | 285/256 |
| 3,174,777 | 3/1965 | Lodholm et al. | 285/252 |
| 3,389,442 | 6/1968 | Tetzlaff | 285/252 X |
| 3,653,692 | 4/1972 | Henson | 285/242 |

*Primary Examiner*—Alfred R. Guest
*Attorney, Agent, or Firm*—Craig & Antonelli

[57] ABSTRACT

A hose connection between a hose and a tubular member, such as a nipple and the like, in which the tubular member includes a first enlargement adjacent its mouth portion and a second enlargement more remote from this mouth portion, whose diameter is preferably smaller than that of the first enlargement; a ring surrounds the hose, in turn surrounding the tubular member, and presses the hose against the flank of the first enlargement remote from the mouth portion; the ring, with an established connection, is located between the two enlargements while its diameter is so selected that it surrounds the hose at least closely, once the connection is established, and is movable within the area of the second enlargement against the deformation resistance of the material of the hose.

31 Claims, 1 Drawing Figure

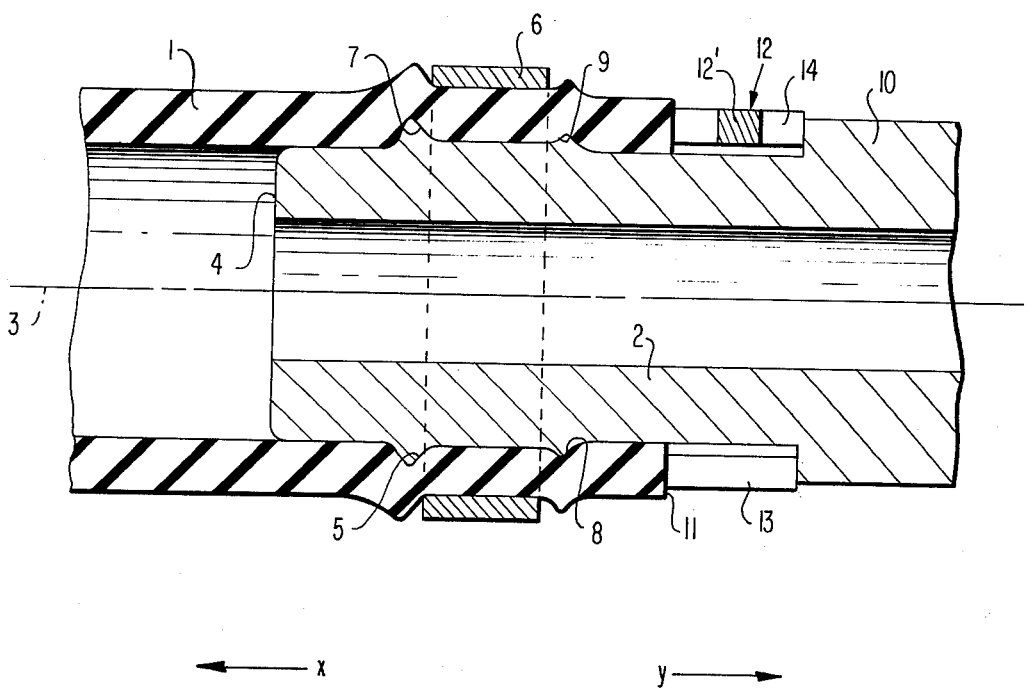

HOSE CONNECTION

The present invention relates to a connecting arrangement between a flexible hose and a rigid tubular member extending into the hose such as a pipe end, a short pipe connection, a nipple, a spigot or the like, which includes an axially symmetrical enlargement adjacent to the mouth of the tubular member, for instance, in the form of an annular rib projecting radially outwardly and a clamping ring adapted to slide over and surround the hose and to press the hose against that flank of the annular rib which is remote from the mouth of the tubular member, whereby the movement of the ring in the direction toward the mouth is limited by the hose within the area of such flank.

Hose connections are known in which the enlargement in the form of an annular rib portion has a completely or approximately conical surface, widening in the direction of the mouth of the tubular member, and the ring has a complementary inner surface. By reason of the conical construction of the inner surface of the ring, such prior art constructions are expensive and unsuitable for cheap mass production. They further entail the disadvantage of producing a reliable, leakage-free connection only in case when and as long as there is an adequate pressure on the inside of the pipe system, which effects an adequate pull in the axial direction in the sense of a movement of the hose away from the tubular member. However, as soon as the pressure in the system approaches atmospheric pressure, a reliable connection is no longer assured because in case of absence of the mentioned pull in the axial direction, the hose carries out a movement in the direction toward the tubular member. In particular, when the pressure in the system collapses suddenly, then there takes place a sudden, jerk-like movement of the hose toward the tubular member. Such a movement causes the ring to move away from the mouth of the tubular member in the direction toward the center of the pipe, i.e., in the direction toward the mouth of the hose and beyond the same, which may lead to a complete separation or disengagement of the connection, especially during repeated occurrences, as well as during vibrations of the tubular member, of the hose or of the medium on the inside of the system, which are frequently unavoidable. Even if the connection does not completely separate, i.e., in a case in which during a renewed build-up of the pressure in the system after some time an adequate connection is established again, any temporary leakage is undesirable or even completely unacceptable, for instance, due to the high cost of the medium, its flammability or explosion hazards, its poisonous nature or its corrosive properties. However, ambient atmospheric air may also enter the system during a temporary leakage which is equally undesirable or unacceptable, for instance, with medical apparatus connected to a human or animal organ, as well as with a highly explosive medium.

Certain hose connections are known in the art in which the internally conical ring is pressed onto the hose within the area of the cone by means of elements movable in the axial direction, which are wound or screwed onto the tubular member, and which may be assisted by springs acting in the axial direction. However, such types of prior art constructions are extremely expensive in manufacture and assembly and are totally unsuitable for inexpensive mass production and assembly line installation or an inexpensive servicing assembly. Added thereto is the fact that with this type of a connection, the abutment pressure of the ring depends on the tightening of the threaded parts, which requires great care during the assembly and renders the connection sensitive against assembly errors.

The present invention aims at a simple and inexpensive connection between a hose and a tubular member which is also reliable and insensitive against assembly errors and which can be rapidly established. To this end a connecting arrangement between a hose and a tubular member of the aforementioned type is constructed according to the present invention in such a manner that a second axially symmetrical enlargement of the tubular member, for instance, again in the form of an annular rib portion, is provided disposed remote from the mouth of the tubular member, whose maximum diameter is preferably smaller than that of the first enlargement whereby the ring is located axially between the two enlargements when the connection is established, that at least the inner surface of the ring is essentially cylindrical, and that the inner diameter of the ring is so selected and determined that the ring at least closely surrounds the hose with an established connection and is movable in the axial direction within the area of the second enlargement against the deformation resistance of the material of the hose.

These measures result in an extraordinarily inexpensive and simultaneously reliable connection in which assembly errors are not possible. During a movement of the hose toward the tubular member, the ring closely surrounding the hose is taken along by the hose, whereby, however, the second enlargement opposes to the ring the deformation resistance of the material of the hose so that the ring cannot move on the hose away from the mouth of the tubular member toward the mouth of the hose. A separation of the connection is reliably prevented thereby also with a repeated decrease of the pressure in the system. A further advantage results from the fact that extraordinarily simple, even makeshift tools such as screwdrivers and sheet metal strips suffice for establishing and separating the connection since only the ring has to be moved in the axial direction. It even suffices in many cases for establishing the connection to slide the ring on the hose mounted over the tubular member from the mouth of hose up to in front of the second enlargement and then to pull the hose in the direction away from the tubular member whereby the ring is pulled over the second enlargement into the axial area between the two enlargements. A further advantage resides in that only very little space is necessary for establishing and disengaging the connection, i.e., only that space which is necessary for applying, for example, screwdrivers or sheet metal strips whereas with the heretofore customary connections, threaded parts have to be turned whereby tools are necessary for the actuation thereof which require considerably more space.

In one embodiment, the external diameter of the second enlargement in the form of an annular rib is smaller than the external diameter of the first enlargment also in the form of an annular rib. As will be described more fully hereinafter, the mounting and dismounting of the assembly is considerably facilitated by this measure.

In one particular embodiment of the present invention, the outer diameter of the tubular member is so selected within the axial area between the two enlargements that with an established connection, the hose surrounds the tubular member at least intimately. It is achieved by this measure that the ring surrounds the hose always intimately or closely and this condition cannot be cancelled out by an indenting or radial shrinkage of the hose. It is assured thereby that the ring always partakes in every movement of the hose in the axial direction. Additionally, it is assured by the described measure that no medium can reach between the hose and the tubular member within the axial area between the two enlargements also when the ring, with a lacking or inadequate pressure in the system, does not press against the hose within the area of the flank remote from the mouth of the enlargement located near the mouth.

According to another preferred type of construction, the ring is constructed cylindrically, i.e., it is cylindrical both at its inner as also at its outer surface. This type of construction will be used in all cases where the outer surface of the ring for any reason whatsoever, for example, for assembly reasons should not be constructed cylindrically in an exceptional case. Tests have demonstrated that reliable connections can be established also at high internal pressures by means of cylindrical rings without damaging the hose. With a correct matching of the configuration of the flank remote from the mouth of the tubular member of the enlargement adjacent the mouth, with respect to the wall thickness and the properties of the materials of the hose, it suffices to break off the edges of the ring. It is therefore possible to saw off or punch off the rings from pipes and to break the edges thereof in simple drum-type machines as are used for deburring cast and pressed-out parts. This type of construction permits a particularly inexpensive mass production. In those cases where a mere breaking off of the edges should not suffice, a unilateral upset of the rings, i.e., on one side is undertaken.

In one embodiment of the present invention, the two enlargements are so arranged axially to one another and the axial dimension of the ring is so selected that the ring is axially movable between the two enlargements with an established connection. With this construction the ring can partake together with the hose in a movement of the hose toward the tubular member when a pressure drop occurs in the system. This type of construction favors the penetration of the medium between the hose and the tubular member within the area of the enlargement adjacent the mouth. It will be used in those cases in which one expects from the presence of the fluid medium between the hose and the tubular member a sealing effect and/or a protective action on the material of the hose, for example, at high temperatures of the metallic tubular member where the danger exists that the hose will adhere by caking to the tubular member due to the action of the high temperatures. The distance along which the ring is axially movable will, of course, always be selected so as to be small.

In another embodiment of the present invention, the two enlargements are arranged axially with respect to one another in such a manner and the axial dimension of the ring is selected in such a manner that the ring is axially retained by the hose essentially play-free between the two enlargements once the connection is established. In this embodiment, the ring abuts at the hose within the area of the flanks of the enlargements facing the same also in the absence of any pressure in the system. In this manner also during the beginning of a pressure build-up in the system an escape of medium out of the system as well as with a pressureless system or with a vacuum within the same a penetration of atmospheric air into the system is reliably prevented. In this embodiment the ring engages detent like between the two enlargements during the assembly. This essentially play-free or clearance-free construction is suited above all for a yielding material of the hose which is only slightly elastic.

In still another embodiment of the present invention, the two enlargements are axially arranged with respect to one another in such a manner and the axial dimension of the ring is selected in such a manner that the ring, with an established connection, presses against the hose within the area of the flanks of the two enlargements facing the ring with the force effected by the deformation of the material of the hose. This type of construction is particularly suited for highly elastically deformable materials of the hose.

A particularly reliable connection is obtained in that the two enlargements, the ring and the tubular member are arranged in such a manner and/or are selected in their dimensions in such a manner that with an established connection the ring presses the hose against the flanks of the enlargements facing the same as also radially against the axial section of the tubular member located between the two enlargements, which requires the selection of the diameter of the tubular member as described above.

A further feature of the present invention resides in that the tubular member includes, on the side of the second enlargement opposite its mouth, a collar or shoulder which limits the movement of the hose in the direction toward the tubular member, possibly by way of an intermediate member. A movement of the hose toward the tubular member, in case of a pressure drop in the system, is kept within small values or is completely eliminated by these measures. These measures are also applicable in a case in which the ring has a slight play between the two enlargements with an established connection, or such a play cannot be prevented over longer periods of time. It is self-evident that the likelihood of a movement of the ring in the direction toward the mouth of the hose over the second enlargement is the smaller, the less the movement of the hose toward the tubular member.

Accordingly, it is an object of the present invention to provide a hose connection which avoids by simple means the aforementioned shortcomings and drawbacks encountered in the prior art.

Another object of the present invention resides in a hose connection which is simple in construction and permits inexpensive manufacture and installation.

A further object of the present invention resides in a hose connection which is not only inexpensive in manufacture and reliable in operation but is particularly suitable for mass production techniques both with respect to manufacture and installation.

Still a further object of the present invention resides in a hose connection of the type described above which is reliable in operation under all conditions even if the system is subjected to large pressure fluctuations.

Another object of the present invention resides in a hose connection which not only entails all of the advantages described above but additionally is highly versatile as to its application by mere appropriate selection of certain parameters of the individual parts.

These and further objects, features and advantages of the present invention will become more apparent from the following description when taken in connection with the accompanying drawing which shows, for purposes of illustration only, one embodiment in accordance with the present invention, and wherein The single FIGURE is an axial cross-sectional view through a connection between a hose and a tubular member in accordance with the present invention.

Referring now to the single FIGURE of the drawing, a hose 1 of any suitable material is mounted over a tubular member 2, such as a pipe end, a nipple or the like, which has an axis 3 and a mouth portion 4.

The tubular member 2 includes a first axially symmetrical enlargement 5 adjacent its mouth portion 4. A ring 6 surrounds the hose 1 enclosing the tubular member 2. In case of pressure on the inside of the system 1, 2 which effects a pull in the direction of the axis 3 in the direction of arrow X in the sense of a movement of the hose 1 away from the tubular member 2, the ring 6 presses the hose 1 against the flank 7 of the first enlargement 5 opposite or remote from the mouth portion 4 whereby the movement of the ring 6 toward the mouth portion 4 in the direction of the arrow X is limited by the hose within the area of the mentioned flank 7.

A second axially symmetrical enlargement 8 is provided on the side of the enlargement 5 of the tubular member 2 opposite or remote from the mouth portion 4; the maximum diameter of the second enlargement 8 is smaller than that of the first enlargement 5. The two enlargements 5 and 8 may thereby be in the form of simple rib portions. The ring 6 is located in the axial area between the two enlargements 5 and 8 when the connection is established. The ring 6 is cylindrical. The inner diameter of the ring 6 is so selected that the ring 6 is movable in the direction of the axis 3 within the area of the second enlargement 8 against the deformation resistance of the material of the hose 1. The outer diameter of the tubular member 2 is so selected within the axial area between the two enlargements 5 and 8 that the ring 6 presses the hose 1 radially against the tubular member 2.

The two enlargements 5 and 8 are axially arranged with respect to one another in such a manner and the axial dimension of the ring 6 is selected in such a manner that the ring 6, with an established connection, is retained axially without play by the hose 1 between the two enlargements 5 and 8 and presses with the force effected by the deformation of the material of the hose 1 against the hose within the area of the flanks 7 and 9 of the two enlargements 5 and 8 facing the ring.

The tubular member 2 is provided on its side of the second enlargement 8 opposite its mouth portion 4 with a collar or shoulder portion 10 which limits the movement of the hose 1 toward the tubular member 2 in the direction of the arrow Y. The collar 10 may be rigidly connected with the tubular member 2 or may also be arranged movable on the same, which also facilitates the establishment of the connection. However, the collar 10 may also be constituted by a sturdy fixed machined part which is connected with the tubular member 2.

The dimensions of the two enlargements 5 and 8 are illustrated in the drawing enlarged in the radial direction for the sake of clarity. Additionally, the configuration of the generatrices of the enlargements 5 and 8 is to be considered only as exemplary and depends in a given case on the pressure in the system, on the wall thickness and material properties of the hose, on the temperature and on the type of the medium and the like. As to the rest, tests have indicated that no great demands or requirements have to be made as regards the accuracy of dimensions and an inexpensive machining, for example, by an automatic tool is completely sufficient.

It would be quite feasible to construct the diameters of the two enlargements 5 and 8 of identical dimensions because one might expect therefrom, for example, a saving in costs to machine the nipple from standard rod stock whereby the diameter of the rod would also produce the diameters of the enlargements. However, such a construction of the nipple would make necessary, on the one hand, an extraordinarily large amount of force for the displacement of the ring 6 over the second enlargement 8 and, on the other, a limited safety against a pulling away of the ring over the first enlargement 5 toward the mouth 4 of the nipple 2. Even only a slight reduction of the diameter of the second enlargement with respect to the diameter of the first enlargement is therefore preferable in all cases and frequently also sufficient.

During the establishment of the connection, the ring 6 is brought into the area between the second enlargement 8 and the collar 10 and thereafter the hose 1 is slipped over the tubular member 2 until it abuts at the collar 10 whereby the ring 6 has received the same. Thereafter, the ring 6 is displaced in the direction of the arrow X toward the mouth portion 4 over the second enlargement 8. The deformation resistance of the material of the hose 1 has to be overcome thereby within the area of the second enlargement 8. As soon as the ring 6 has been displaced beyond the axial area of the largest diameter of the enlargement 8, it engages snap-button-like between the two enlargements or between the two axial sections of the hose disposed in the area of the flanks 7 and 9 of the enlargements 5 and 8 facing the ring 6, and the connection is made.

With a pressure build-up on the inside of the system 1, 2 the hose 1 has the tendency to move away from the tubular member 2 in the direction of arrow X. However, since the ring 6 presses against the hose 1 and follows such a movement, and since its movement in the direction of arrow X is limited by the hose within the axial area of the flank 7 of the enlargement 5 adjacent the mouth portion 4, the connection remains preserved. With a decrease of the pressure in the system 1, 2, the hose 1 has the tendency to move toward the tubular member 2 in the direction of the arrow Y. The hose 1 thereby takes along the ring 6 in the same direction. Since a movement of the ring 6 toward the mouth portion 11 of the hose 1 in the direction of the arrow Y now encounters the deformation resistance of the material of the hose within the area of the second enlargement 8, this movement is limited to a minimum or is completely prevented. The ring 6 thus cannot move in the direction of the arrow Y over and beyond the second enlargement 8. As a result thereof, a movement of the hose 1 toward the tubular member 2 in the direction of the arrow Y is also reliably prevented by the ring 6 and by the second enlargement 8.

The collar or shoulder 10 additionally precludes a movement of the hose 1 in the direction of the arrow Y. A spacer member generally designated by reference numeral 12 is arranged between the end face 11 of the hose 1 opposite the mouth portion 4 of the nipple and the collar 10, which spacer member 12 together with the collar 10 limits a movement of the hose 1 in the direction of the arrow Y.

The spacer member 12 is constructed as open ring which is radially slipped over the nipple and is pressed thereagainst by deformation. The opening in the ring 12, i.e., the circumferential spacing between the ring ends providing an axial opening is designated by reference numeral 13 while notches or grooves which extend in the direction of a generatrix of the ring 12 or in the circumferential direction of the ring are designated by reference numeral 14 which provide circumferential web sections 12′ of reduced thickness in the axial direction and thus determine a limited zone of deformation and therewith assure the maintenance of the radius on both sides of the deformation zone.

The intermediate member 12, however, can also be constructed in a different manner, for example, as a winding or coil of a cord, wire, insulating band, or as horseshoe shaped springy or resilient clamp.

The use of the described intermediate member 12 permits a particularly simple manner of establishing the connection between the hose and the nipple. The hose 1 is mounted over the nipple 2 until its end face 11 contacts the collar 10. Thereupon, the ring 6 is slipped over the hose 1 in the direction of the arrow X until approximately the second enlargement 8 prevents a further movement of the ring 6. Thereafter, the hose 1 is pulled in the direction of the arrow X whereby the ring 6 is taken along up to its axial position between the two enlargements 5 and 8, whence the connection is established. The axial intermediate space between the end face 11 of the hose 1 and the collar 10 is then filled out by the intermediate member 12.

If, on the other hand, the connection is established as described more fully hereinabove, i.e., if the ring 6 is slipped over the hose 1 in the direction of the arrow X with the hose relatively stationary to the nipple whereby the hose 1 remains directly adjacent the collar 10, then the intermediate member 12 is obviated because in this case a movement of the hose 1 in the direction of arrow Y is prevented directly by the collar 10 itself.

The collar 10 as well as possibly the intermediate member 12 can be dispensed with altogether in many cases, and the connecting arrangement is also lasting and reliable without these additional elements.

The illustrated connecting arrangement is absolutely stable even with repeated rhythmic pressure fluctuations of the medium as well as with vibrations of the parts forming the same or of the medium.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A connection between a hose and a tubular member having a mouth portion, which includes an enlargement on the tubular member near the mouth portion thereof as well as a closed, unbroken ring means which surrounds the hose, in turn surrounding the tubular member, and which presses the hose against the flank of the enlargement opposite the mouth portion, the movement of said ring means in the direction toward the mouth portion being limited by the hose within the area of said last mentioned flank, characterized in that a second enlargement is provided on the tubular member which is arranged remote from the mouth portion thereof, the ring means having an inner diameter which will pass over the end of the hose inward of the second enlargement and so sized that with the fluid flow of the material of the hose, the ring means will pass over the second enlargement but not over the first enlargement, the ring means, with an established connection, being disposed axially between the two enlargements, at least the inner surface of the ring means being approximately cylindrical and the inner diameter of the ring means being so selected that the ring means at least closely surrounds the hose with an established connection and is movable in the axial direction within the area of the second enlargement against the deformation resistance of the material of the hose.

2. A hose connection according to claim 1, characterized in that the external diameter of the second enlargement is smaller than the external diameter of the first enlargement.

3. A hose connection according to claim 2, characterized in that the enlargements are axially symmetrical.

4. A hose connection according to claim 2, characterized in that the outer diameter of the tubular element is so selected within the axial area between the two enlargements that with an established connection the hose at least closely surrounds the tubular member.

5. A hose connection according to claim 4, characterized in that the ring means is cylindrical.

6. A hose connection according to claim 5, characterized in that the two enlargements are axially arranged with respect to one another in such a manner and the axial dimension of the ring means is so selected that the ring means, with an established connection, is axially movable between the two enlargements.

7. A hose connection according to claim 5, characterized in that the two enlargements are axially arranged with respect to one another in such a manner and the axial dimension of the ring means is so selected that the ring means, with an established connection, is axially retained essentially without play between the two enlargements by the hose.

8. A hose connection according to claim 5, characterized in that the two enlargements are axially so arranged to one another and the axial dimension of the ring means is so selected that the ring means, with an established connection, presses against the hose with the force effected by the deformation of the material of the hose within the area of the flanks of the two enlargements facing the ring means.

9. A hose connection according to claim 5, characterized in that the tubular member includes on its side of the second enlargement opposite the mouth portion thereof a collar means which limits the movement of the hose toward the tubular member.

10. A hose connection according to claim 9, characterized in that an intermediate member is interposed between the collar means and the mouth portion of the hose.

11. A hose connection according to claim 10, characterized in that the intermediate member is provided with circumferential groove means to maintain its predetermined shape.

12. A hose connection according to claim 11, characterized in that said intermediate member is an open ring pressed onto the tubular member.

13. A hose connection according to claim 12, characterized in that each enlargement forms a radially outwardly projecting rib.

14. A hose connection according to claim 13, characterized in that each rib is axially substantially symmetrical.

15. A hose connection according to claim 14, characterized in that each rib is of approximately triangular configuration as viewed in axial cross section.

16. A hose connection according to claim 15, characterized in that the two enlargements are axially arranged with respect to one another in such a manner and the axial dimension of the ring means is so selected that the ring means, with an established connection, is axially movable between the two enlargements.

17. A hose connection according to claim 15, characterized in that the two enlargements are axially arranged with respect to one another in such a manner and the axial dimension of the ring means is so selected that the ring means, with an established connection, is axially retained essentially without play between the two enlargements by the hose.

18. A hose connection according to claim 15, characterized in that the two enlargements are axially so arranged to one another and the axial dimension of the ring means is so selected that the ring means, with an established connection, presses against the hose with the force effected by the deformation of the material of the hose within the area of the flanks of the two enlargements facing the ring means.

19. A hose connection according to claim 1, characterized in that the outer diameter of the tubular element is so selected within the axial area between the two enlargements that with an established connection the hose at least closely surrounds the tubular member.

20. A hose connection according to claim 1, characterized in that the ring means is cylindrical.

21. A hose connection according to claim 1, characterized in that the two enlargements are axially arranged with respect to one another in such a manner and the axial dimension of the ring means is so selected that the ring means, with an established connection, is axially movable between the two enlargements.

22. A hose connection according to claim 1, characterized in that the two enlargements are axially arranged with respect to one another in such a manner and the axial dimension of the ring means is so selected that the ring means, with an established connection, is axially retained essentially without play between the two enlargements by the hose.

23. A hose connection according to claim 1, characterized in that the two enlargements are axially so arranged to one another and the axial dimension of the ring means is so selected that the ring means, with an established connection, presses against the hose with the force effected by the deformation of the material of the hose within the area of the flanks of the two enlargements facing the ring means.

24. A hose connection according to claim 1, characterized in that the tubular member includes on its side of the second enlargement opposite the mouth portion thereof a collar means which limits the movement of the hose toward the tubular member.

25. A hose connection according to claim 24, characterized in that an intermediate member is interposed between the collar means and the mouth portion of the hose.

26. A hose connection according to claim 25, characterized in that the intermediate member is provided with groove means to maintain its predetermined shape.

27. A hose connection according to claim 25, characterized in that said intermediate member is an open ring pressed onto the tubular member.

28. A hose connection according to claim 1, characterized in that each enlargement forms a radially outwardly projecting rib.

29. A hose connection according to claim 28, characterized in that each rib is of approximately triangular configuration as viewed in axial cross section.

30. A hose connection according to claim 1, characterized in that the axial length of the ring means is approximately equal to the spacing of the two enlargements.

31. A hose connection according to claim 1, characterized in that the ring means is of one-piece, continuous construction.

* * * * *